United States Patent [19]

Casper

[11] Patent Number: 5,654,599
[45] Date of Patent: Aug. 5, 1997

[54] DYNAMICALLY TIMED ELECTRIC MOTOR

[75] Inventor: Ann M. Casper, Enfield, Conn.

[73] Assignee: The United States of America as represented by the Administrator of the National Aeronautics and Space Administration, Washington, D.C.

[21] Appl. No.: 365,880

[22] Filed: Dec. 29, 1994

[51] Int. Cl.$^6$ .................................................. H02K 29/08
[52] U.S. Cl. ............................... 310/68 B; 310/237
[58] Field of Search ............................ 310/128, 173, 310/233, 237, 273, 68 B

[56] References Cited

U.S. PATENT DOCUMENTS

| | | | |
|---|---|---|---|
| 2,437,591 | 3/1948 | Briskin et al. | 192/150 |
| 4,396,850 | 8/1983 | Herr | 310/239 |
| 4,628,891 | 12/1986 | Asai et al. | 123/599 |
| 4,782,255 | 11/1988 | Oosaka et al. | 310/68 R |
| 4,888,481 | 12/1989 | Kallin et al. | 250/231 SE |
| 5,537,012 | 7/1996 | Yaguchi | 318/254 |

FOREIGN PATENT DOCUMENTS

| | | | |
|---|---|---|---|
| 3813064 | 4/1988 | Germany | H02K 29/08 |
| 4000250 | 4/1992 | Japan | H02K 29/08 |
| 7284251 | 10/1995 | Japan | H02K 11/00 |

*Primary Examiner*—Thomas M. Dougherty
*Attorney, Agent, or Firm*—Robert L. Broad, Jr.

[57] ABSTRACT

A brushless DC motor including a housing having an end cap secured thereto. The housing encloses a rotor, a stator and a rotationally displaceable commutation board having sensors secured thereon and spaced around the periphery of the rotor. An external rotational force is applied to the commutation board for displacement of the sensors to various positions whereby varying feedback signals are generated by the positioning of the sensors relative to the rotating rotor. The commutation board is secured in a fixed position in response to feedback signals indicative of optimum sensor position being determined. The rotation of the commutation board and the securing of the sensors in the desired fixed position is accomplished without requiring the removal of the end cap and with the DC motor operating.

8 Claims, 3 Drawing Sheets

DYNAMICALLY TIMED ELECTRIC MOTOR

ORIGIN OF THE INVENTION

This invention was made with government support under contract NAS8-50000 awarded by the National Aeronautics and Space Administration. The Government has certain rights in this invention.

BACKGROUND OF THE INVENTION

1. Field of the Invention

The present invention is generally directed to electric motors having internal sensors for providing motor rotor position feedback and more particularly to method and apparatus for dynamically adjustably positioning the sensors relative to the motor rotor to obtain maximum motor efficiency.

2. Description of the Related Art

In the past, "fine tuning" of electric motors was accomplished statically be removing the motor end cap, loosening a plurality of commutation board mounting screws and manually rotating the commutation board assembly by a minute amount. The commutation board was then resecured to the housing by the commutation board mounting screws, and the motor was then re-assembled and an electric current reading was taken while the motor was operating. This procedure had to be repeated until approximately minimum current flow was obtained.

SUMMARY OF THE INVENTION

The windings of a brushless DC motor are commutated using motor rotor position feedback signals provided by Hall Effect sensors. These sensors are mounted radially in a precise relationship to each other on a circular commutation board. This subassembly in turn is then mounted to the back of the motor stator housing. The commutation board has a concentric hole to allow the motor rotor shaft and a portion of the motor rotor to pass through it. In order to obtain maximum motor efficiency it is important that the stator coil is excited with an induced voltage at a precisely correct moment when the motor rotor is in a certain position. The motor of the present invention is dynamically timed by rotating the commutation board and, therefore, the sensors to the desired position without requiring any disassembly of the motor. A tool is inserted in openings in the motor end cap for engaging and rotating a plurality of commutation board mounting screws (which secure the commutation board to the housing) to loosen the board and thus permit the rotational displacement thereof. The board and, therefore, the sensors are then rotated by inserting the tool in a second hole in the end cap and engaging and rotating a pinion gear segment (which is secured to the housing) and in meshed relation with a rack gear segment (which is secured to the commutation board). Rotation of the commutation board and sensors is accomplished with the motor running and with electrical current readings being simultaneously taken. When minimum electrical flow is indicated, the position of motor efficiency is reached and the commutation board is secured by reinserting the tool through the openings in the end cap which is aligned with the commutation board mounting screws for engaging and securing the commutation board mounting screws.

It is therefore, an object of the present invention to eliminate the cumbersome procedure inherent with static timing processes of DC motors and at the same time improve the accuracy of the timing process to increase the operating efficiency of a DC motor.

It is a further object of the present invention to provide such DC motors with means for the dynamic timing thereof without requiring any disassembly of the motor.

DESCRIPTION OF THE PREFERRED EMBODIMENT

Figure 1:
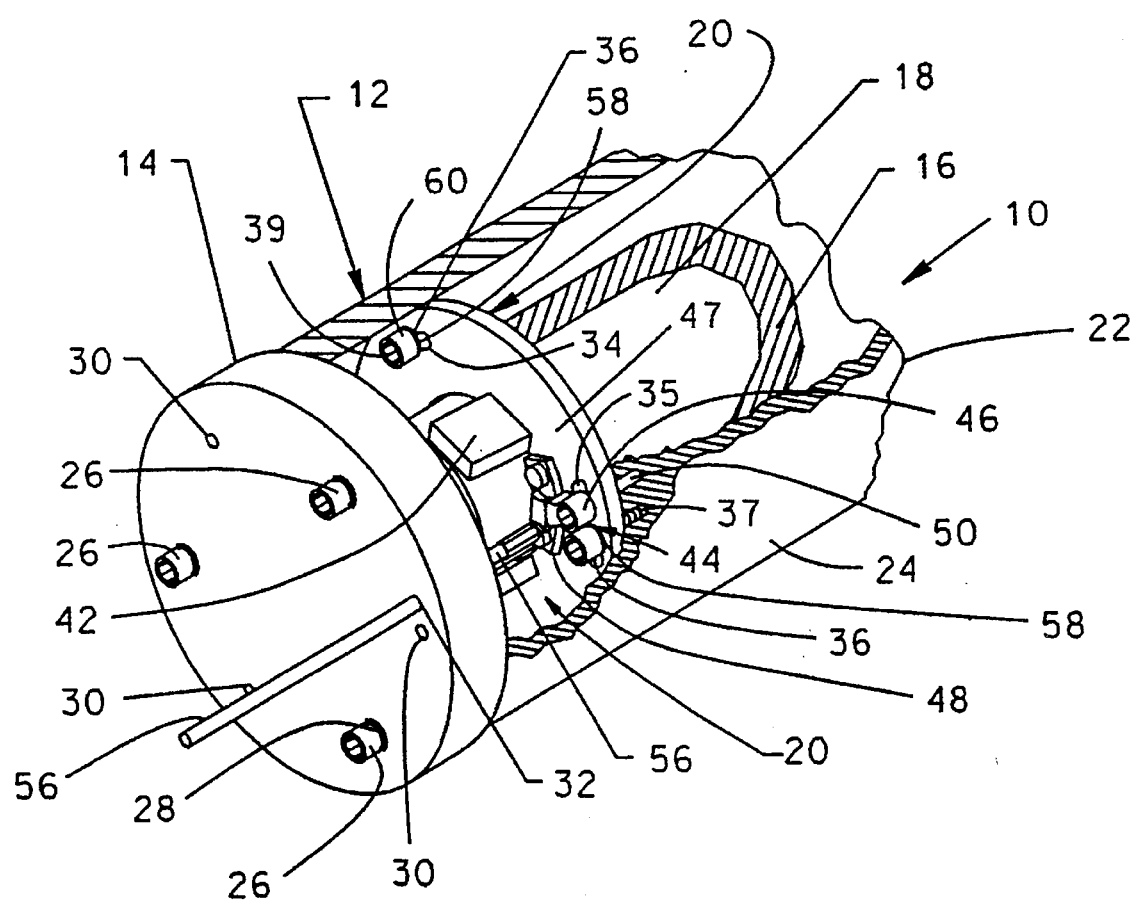
FIG. 1 is a pictorial, partially broken away view of the electric motor of the present invention and illustrates the motor having a housing which encloses a motor rotor, a motor stator and a commutation board having internal sensors and dynamic adjusting mechanism mounted thereon. An end cap is shown positioned on an end of the housing.

As seen in FIG. 1 a DC motor 10 includes an outer housing 12 including an end cap 14 enclosing a motor stator 16, a motor rotor 18 and a commutation board 20. Housing 12 is further shown to include an outer shell 24 including a bottom portion 22. End cap 14 is shown to be provided with screws 26 which extend through openings 28 in the end cap for secured relation with housing 12 to secure the end cap thereto. A plurality of commutation board mounting screw access holes 30 and a commutation board displacement mechanism access hole 32 is provided in the end cap for reasons explained hereinbelow.

Figure 2:
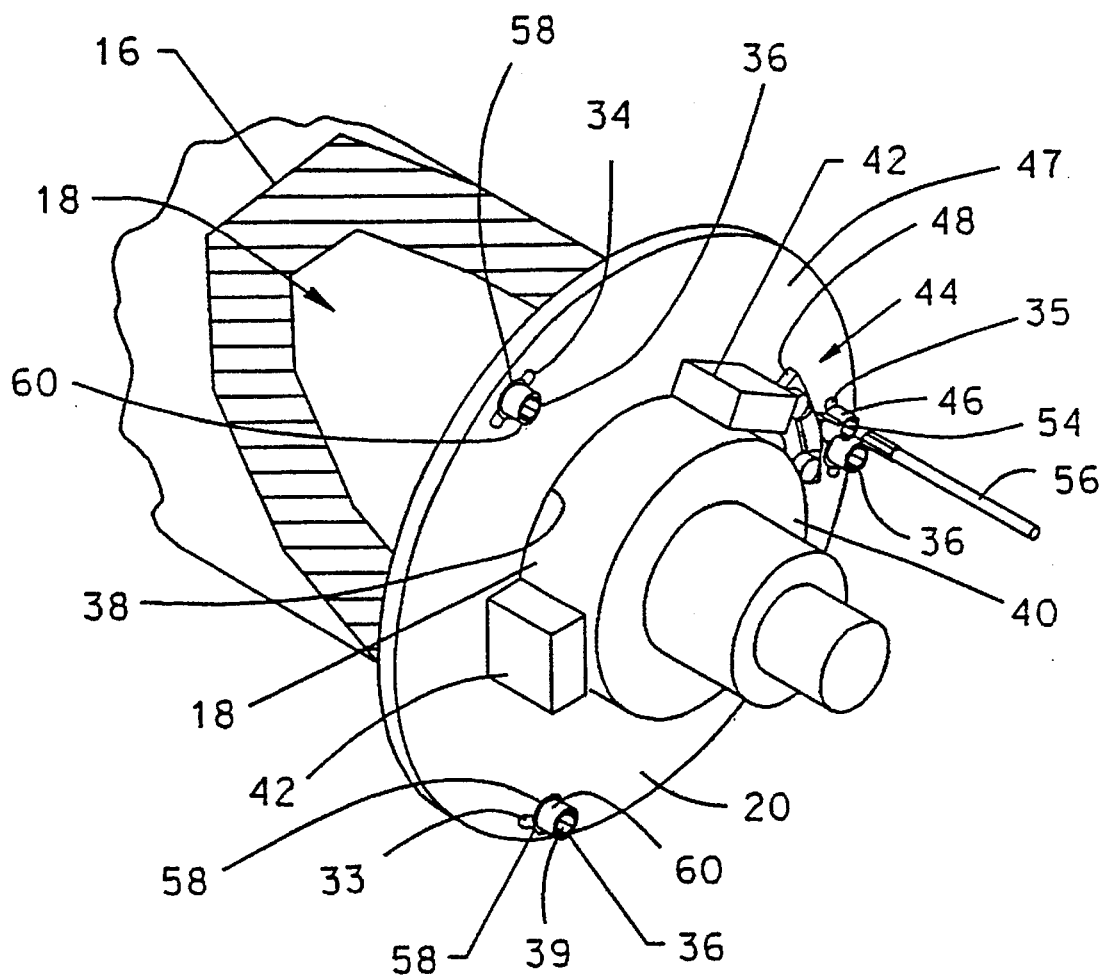
FIG. 2 is a pictorial, partially broken away view of the motor stator and motor rotor of FIG. 1 and illustrates a commutation board provided with internal sensors and the mechanism for adjusting the position of the commutation board and sensors.
Figure 3:
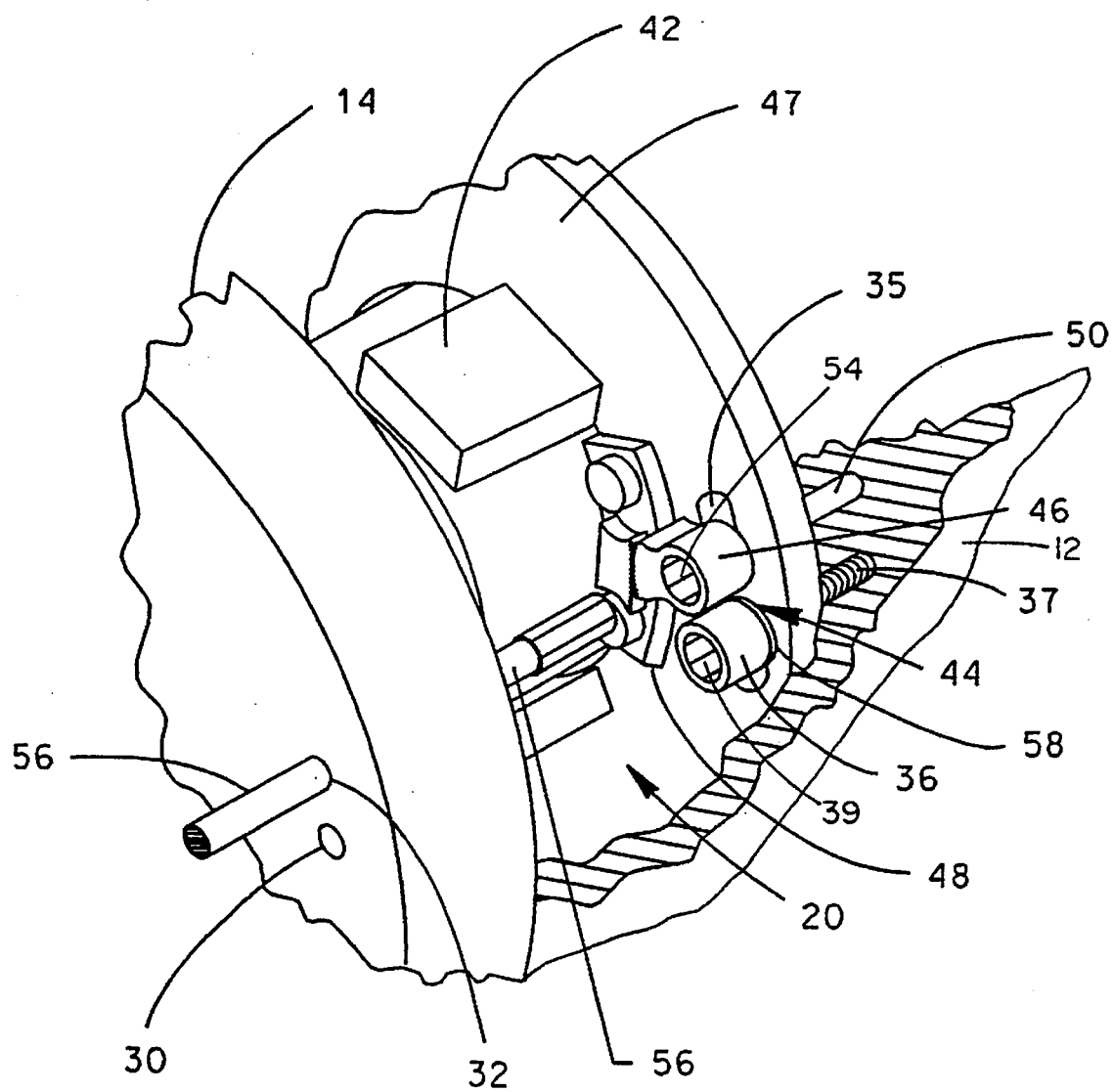
FIG. 3 is an enlarged pictorial fragmented view of the commutation board and adjusting mechanism shown in FIG. 2.

Commutation board 20 is shown to include a plurality of slotted openings 33, 34 and 35 (better shown in FIG. 2) positioned adjacent the periphery thereof through which a like plurality of fasteners 36 (such as screws having threaded shaft portion 37 and a socket 39) extend for secured relation of board 20 to housing 12. A central opening 38 (FIG. 2) is provided in commutation board 20 through which an upper portion 40 of motor rotor 18 extends. A plurality of Hall Effect sensors 42 are precisely positioned around upper portion 40 of rotor 18. The relationship of the Hall Effect Sensors to each other and the distance from the motor rotor are established during assembly of the commutation board. A commutation board positioning mechanism 44 is mounted on the commutation board 20. The positioning mechanism 44 includes a pinion gear sector 46 and an adjustment (drive) gear sector 48. Pinion gear sector 46 is mounted adjacent the upper surface 47 of the commutation board 20 by a pin 50 (FIG. 1) which is secured to and extends from housing 12 and through a slotted opening 35 in the commutation board. Pinion gear sector 46 is provided with a central opening 54 or socket (FIG. 2 and 3) to receive an adjustment tool 56 therein. The pinion gear sector 46 drives the gear sector 48 which is mounted stationary to the commutation board and thereby rotate the commutation board 20 within the confines of the slotted opening 35. The pinion and drive gears have fine teeth which allow for fine radial adjustment of the commutation board subassembly. The pinion and drive gear also have provisions to obtain zero backlash.

A single slotted opening 35 is shown as receiving shaft portion 37 of fasteners 36 therein and as receiving pin 50 of pinion gear sector 46 therein, however, it is to be understood that a pair of discrete slotted openings may be provided, if desired, so that one opening may receive shaft portion 37 and the second opening may receive pin 50.

Preload springs 58 are provided between the heads 60 of each of the fasteners 36 and the upper surface 47 of commutation board 20 to provide a biasing force between heads 60 and surface 47 to prevent undesirable vibrations or "wobble" and rotary motion of the commutation board when the commutation board mounting fasteners 36 are loosened in order to carry out the dynamic "timing" process. Behind and in line with a tool access hole 32 is the mating socket 54 (FIGS. 2 and 3) of the pinion gear sector 46.

To "time" the motor it is only necessary to insert tool 56 through openings 30 and into the sockets 39 of each of the fasteners 36 for rotation thereof to loosen the fasteners 36 and with the commutation mounting fasteners 36 loosened, the adjusting tool 56 is then inserted into its mating socket 54 in pinion gear sector 46. Fine tuning is achieved by rotating the pinion gear sector either clockwise or counter-clockwise for rotational displacement of the board 20 for positioning sensors 42 arcuately relative to the rotor. During the calibration procedure, the preload springs hold the commutation board temporarily in place and against vibrational movement until the commutation board mounting fasteners 36 can be re-tightened. The tool 56 is removed and the holes are plugged.

I claim:

1. A brushless DC motor having a rotor and a stator and a rotationally displaceable commutation board, said DC motor comprising:

a housing enclosing said rotor, said stator and said commutation board, said housing including a tubular side enclosure and a removable end cap;

dynamic timing means for dynamically timing the commutation between said rotor and stator without disassembling said housing, said dynamic timing means including sensors secured on said commutation board for providing rotor position feedback signals and commutation board displacement means for rotationally displacing said commutation board and thus said sensors, relative to said rotor during operation of said DC motor to obtain feedback signals indicative of operational parameters of said DC motor whereby maximum motor operating efficiency is obtained;

commutation board mounting means for releasably mounting said commutation board to said housing and to permit rotational displacement of said board relative to said rotor;

said commutation board being provided with an upper surface and said commutation board mounting means includes a plurality of slotted openings provided adjacent the periphery of said commutation board and screw means extending through said slotted openings for secured relation with said housing, said screw means having a head for engaged relation with said upper surface of said commutation board and a threaded portion for threaded relation in said housing; and said commutation board displacement means including first and second gear sectors disposed in meshed relation, said first gear sector mounted to said housing and positioned adjacent said upper surface of said commutation board, said second gear sector mounted to said commutator board for meshed relation with said first gear sector.

2. A DC motor as in claim 1 wherein said commutation board displacement means includes first and second gear sectors disposed in meshed relation, said first gear sector mounted to said housing and positioned adjacent said upper surface of said commutation board, said second gear sector mounted to said commutator board for meshed relation with said first gear sector.

3. A DC motor as set forth in claim 1 wherein said end cap is provided with a first plurality of access holes to permit access to said commutation board mounting means for rotation thereof to free said board for said rotational displacement thereof and to secure said board to said housing, and a second access hole to permit access to said first gear sector for rotational movement thereof to impart said rotational displacement to said commutation board.

4. A DC motor as in claim 3 including commutation board biasing means for preventing undesirable vibrational displacement of said commutation board during said rotational displacement thereof.

5. A DC motor as in claim 4 wherein said biasing means are preload springs mounted between said upper surface of said commutation board and said head of said screw means.

6. A DC motor as in claim 5 wherein said sensors are Hall Effect Sensors.

7. A brushless electric motor having a rotor, a stator and a commutation board having an upper surface and feedback sensors secured thereon, said feedback sensors disposed for being positioned in optimum positions relative to said rotor and said stator to achieve substantially maximum motor efficiency, timing means to dynamically time said electric motor by determining said optimum positions, said timing means being operable without requiring any disassembly of said motor, said motor comprising:

a housing enclosing said commutation board, said rotor and said stator;

said timing means including means for rotating said commutation board and said feedback sensors during operation of said motor for providing varying rotor position feedback signals including feedback signals indicative of a substantially optimum position of said feedback sensors which provides for maximum operating efficiency of said motor during operation of said motor, said means for rotating said commutation board includes first and second gear sectors disposed for meshed relation, said first gear sector mounted to said housing and positioned adjacent said upper surface of commutation board, said second gear sector mounted to said upper surface of said commutation board for meshed relation with said first gear sector;

means for rotating said first gear sector externally of said housing whereby said second gear sector and thus said commutation board is rotationally displaced; and means for securing said commutation board to said housing during motor operation and responsive to said feedback sensors providing the optimum position signals.

8. A brushless electric motor as in claim 7 wherein said feedback sensors are Hall Effect Sensors.

* * * * *